US011935356B2

(12) United States Patent
Dicecilia

(10) Patent No.: US 11,935,356 B2
(45) Date of Patent: Mar. 19, 2024

(54) GAMING SYSTEM

(71) Applicant: SPEKTRA GAMING, LLC, Mt. Pleasant, SC (US)

(72) Inventor: Gennaro Dicecilia, Charleston, SC (US)

( * ) Notice: Subject to any disclaimer, the term of this patent is extended or adjusted under 35 U.S.C. 154(b) by 10 days.

(21) Appl. No.: 18/273,672

(22) PCT Filed: Feb. 11, 2021

(86) PCT No.: PCT/US2021/017532
§ 371 (c)(1),
(2) Date: Jul. 21, 2023

(87) PCT Pub. No.: WO2022/173434
PCT Pub. Date: Aug. 18, 2022

(65) Prior Publication Data

US 2024/0021044 A1 Jan. 18, 2024

(51) Int. Cl.
*G07F 17/00* (2006.01)
*G07F 17/32* (2006.01)

(52) U.S. Cl.
CPC ........ *G07F 17/322* (2013.01); *G07F 17/3209* (2013.01); *G07F 17/3244* (2013.01); *G07F 17/3288* (2013.01)

(58) Field of Classification Search
None
See application file for complete search history.

(56) References Cited

U.S. PATENT DOCUMENTS

| | | | | |
|---|---|---|---|---|
| 5,413,351 A * | 5/1995 | Franklin | G07F 17/32 | 273/274 |
| 6,123,333 A * | 9/2000 | McGinnis, Sr. | G07F 17/3244 | 273/146 |
| 6,213,876 B1 * | 4/2001 | Moore, Jr. | A63F 3/00157 | 273/138.2 |
| 8,113,949 B2 * | 2/2012 | Tsukahara | G07F 17/322 | 463/25 |
| 8,276,915 B2 * | 10/2012 | Berkowitz | A63F 9/0402 | 273/146 |
| 9,827,485 B2 * | 11/2017 | Brinkman | G07F 17/326 | |
| 2002/0036380 A1 * | 3/2002 | Perrie | G07F 17/34 | 463/20 |
| 2003/0155708 A1 * | 8/2003 | Perrie | G07F 17/34 | 463/20 |
| 2004/0104531 A1 * | 6/2004 | Dreaper | A63F 3/00157 | 273/274 |
| 2006/0017225 A1 * | 1/2006 | Nicely | G07F 17/3213 | 273/146 |
| 2006/0033281 A1 * | 2/2006 | Wong | A63F 5/04 | 273/292 |
| 2007/0026947 A1 * | 2/2007 | Chun | A63F 3/00157 | 463/42 |

(Continued)

*Primary Examiner* — Paul A D'Agostino
(74) *Attorney, Agent, or Firm* — QUICKPATENTS, LLC; Kevin Prince

(57) ABSTRACT

A gaming system that offers players many more betting options than conventional gaming, the system comprising multiple aspects, including six dice with colored faces and dots from 1 to 6, the winning faces of which determine the outcome of the game. In another aspect, there are 86 different betting options. In yet another, players are offered various levels of control of the rolling and stopping of the dice, to increase player engagement and satisfaction.

20 Claims, 15 Drawing Sheets

(56) References Cited

U.S. PATENT DOCUMENTS

| | | | | |
|---|---|---|---|---|
| 2007/0075490 | A1* | 4/2007 | Gak | A63F 3/00157 273/146 |
| 2008/0051188 | A1* | 2/2008 | Inamura | G07F 17/3286 463/20 |
| 2008/0248864 | A1* | 10/2008 | Toyoda | A63F 9/0406 463/22 |
| 2009/0247280 | A1* | 10/2009 | Yoshizawa | G07F 17/3213 463/25 |
| 2011/0098095 | A1* | 4/2011 | Kuhn | G06F 3/0488 463/16 |
| 2011/0300921 | A1* | 12/2011 | Peterson | A63F 9/0468 273/146 |
| 2013/0084936 | A1* | 4/2013 | Pease | A63F 13/798 273/274 |
| 2013/0087971 | A1* | 4/2013 | Klein | A63F 9/0406 273/145 A |
| 2014/0162758 | A1* | 6/2014 | Pececnik | G07F 17/3262 463/22 |
| 2016/0067592 | A1* | 3/2016 | Patterson | G07F 17/322 463/20 |
| 2016/0129341 | A1* | 5/2016 | Sahl | A63F 9/0468 273/142 E |
| 2018/0089477 | A1* | 3/2018 | Bergant | A63F 9/0468 |
| 2019/0392685 | A1* | 12/2019 | Adams | G07F 17/3244 |
| 2021/0101073 | A1* | 4/2021 | Bergant | A63F 9/0406 |

* cited by examiner

GAMING SYSTEM

CROSS-REFERENCE TO RELATED APPLICATIONS

This application claims the benefit of PCT Utility Patent Application PCT/US21/17532, filed on Feb. 11, 2021, incorporated herein by reference.

STATEMENT REGARDING FEDERALLY SPONSORED RESEARCH AND DEVELOPMENT

Not Applicable.

FIELD OF THE INVENTION

The present invention generally relates to casino games, and software and hardware for playing such games.

BACKGROUND

Traditional casino games offer very low payout ratios for winning bets, typically paying 1 to 1, and sometimes up to 30-35 to 1, and a limited number of betting options, for example, single number or single color. They also do not typically deal with multiple objects and combinations on which players may place their bets.

Thus, a new gaming system and game is needed to overcome these challenges and offer players a new and exciting entertainment modality.

SUMMARY OF THE INVENTION

One aspect of the present invention is to offer multiple objects, for example in one embodiment six dice, the winning faces of which determine the outcome of the game, and many more betting options, in addition to the straight number of dots on one or more winning faces of the dice. In one embodiment of the present invention there are 86 different betting options. Another aspect of the present invention is to offer much higher payout ratios for some of the betting options, sometimes as high as 44,000 to 1 and many times of 7,400 to 1 or 240 to 1.

Various embodiments provide the advantages and features of the gaming system of the present invention. In one embodiment a system comprises a dice roll device comprising at least six dice with six faces each, wherein the faces have two identifiers, and each of the at least six dice are disposed in a separate compartment of the dice roll device; a wagering table displaying a plurality of betting areas, and the dice roll device disposed on the wagering table; and at least one input device electronically connected to the dice roll device and capable of initiating and stopping rolling of the at least six dice in the dice roll device. In this embodiment of the system, the at least one input device is selected from a lever, a button, a switch, a tablet computer, or a smart phone. In this embodiment of the system, the plurality of betting areas equals 86 and at least one of the plurality of betting areas has an associated payout ratio of 44,000 to 1. In this embodiment of the system, the plurality of betting areas has at least 7 betting areas with an associated payout ratio of greater than 100 to 1. In this embodiment of the system, the two identifiers comprise a first group of identifiers comprising dots from one to six and a second group of identifiers comprising six preselected colors. In this embodiment the system further comprising a rolling apparatus capable of receiving commands from the at least one input device, the rolling apparatus connected to the dice roll device and capable of starting and stopping rolling of the at least six dice in the dice roll device. In this embodiment of the system, the at least one input device further comprises one input device per player. In this embodiment of the system, the at least six dice have unique faces such that no combination of the two identifiers is repeated on any of the at least six dice.

Another embodiment provides a system comprising at least six dice each contained in one of at least six dice roll devices, the dice roll devices comprising at least one compartment designed to contain a die, and each die containing six faces, wherein each of the six faces has two identifiers; a wagering table displaying a plurality of betting areas, and the at least six dice roll devices disposed on the wagering table; a computer comprising a processor and a memory, the computer electronically connected to the at least six dice roll devices, wherein the memory stores a series of instructions that, when executed by said processor, cause the processor to: display rolling of the at least six dice in the at least six dice roll devices; select one winning face for each of the at least six dice; transmit the one winning face for each of the at least six dice to the at least six dice roll devices; stop rolling of the at least six dice in the at least six dice roll devices; and display the one winning face for each of the at least six dice in the at least six dice roll devices; and at least one input device electronically connected to one of the at least six dice roll devices and capable of initiating and stopping rolling of the at least six dice in the at least six dice roll devices. In this embodiment of the system, each of the at least six dice comprise an electronic three-dimensional image of a die. In this embodiment of the system, the at least one input device comprises six input devices each electronically connected to a separate one of the at least six dice roll devices. In this embodiment of the system, the select one winning face is performed randomly or pseudo randomly. In this embodiment of the system, the select one winning face is performed by a pseudo random number generator. In this embodiment of the system, the stop rolling step further comprises stopping each of the at least six dice individually in a predetermined order. In this embodiment of the system, the predetermined order is selected from the group of: stopping dice individually in ascending order, stopping dice individually in descending order, stopping dice by pairs, random order, or stopping dice individually in ascending order of odd numbered dice. In this embodiment of the system, the memory stores a series of instructions that, when executed by the processor, cause the processor to further: create a sequence of instructions causing the processor to: at a first play, start rolling and stop rolling of the at least six dice together; at a second play, start rolling the at least six dice together and to stop the at least six dice one by one; and at a third play, receive a start rolling command for the at least six dice together from a first player through the at least one input device and to stop the at least six dice two at a time.

Yet another embodiment provides a system comprising a dice roll device comprising at least six displays of images of at least six dice with six faces each, wherein the faces have two markings each selected from at least two groups of identifiers; a wagering table displaying a plurality of betting areas, and the dice roll device disposed on the wagering table; a computer comprising a processor and a memory, the computer electronically connected to the dice roll device, wherein the memory stores a series of instructions that, when executed by the processor, cause the processor to: display rolling of the at least six dice in the dice roll device;

select one winning face for each of the at least six dice; transmit the one winning face for each of the at least six dice to the dice roll device; stop rolling of the at least six dice in the dice roll device; and display said one winning face for each of the at least six dice in the dice roll device; and at least one input device disposed on the wagering table, the at least one input device electronically connected to the dice roll device and to the computer, and the at least one input device capable of initiating and stopping rolling of the at least six dice in the dice roll device. In this embodiment of the system, the at least two groups of identifiers comprise a first group of identifiers comprising dots from one to six and a second group of identifiers comprising six preselected colors. In this embodiment of the system, the plurality of betting areas equals 86 and at least one of the plurality of betting areas has an associated payout ratio of 44,000 to 1. In this embodiment of the system, the at least six dice have unique faces such that no combination of the two markings is repeated on any of the at least six dice.

DESCRIPTION OF THE DRAWINGS

The teachings of the present invention can be readily understood by considering the following detailed description in conjunction with the accompanying drawings of the various embodiments and permutations of the invention, in which.

DETAILED DESCRIPTION OF THE PREFERRED EMBODIMENT

Figure 1:
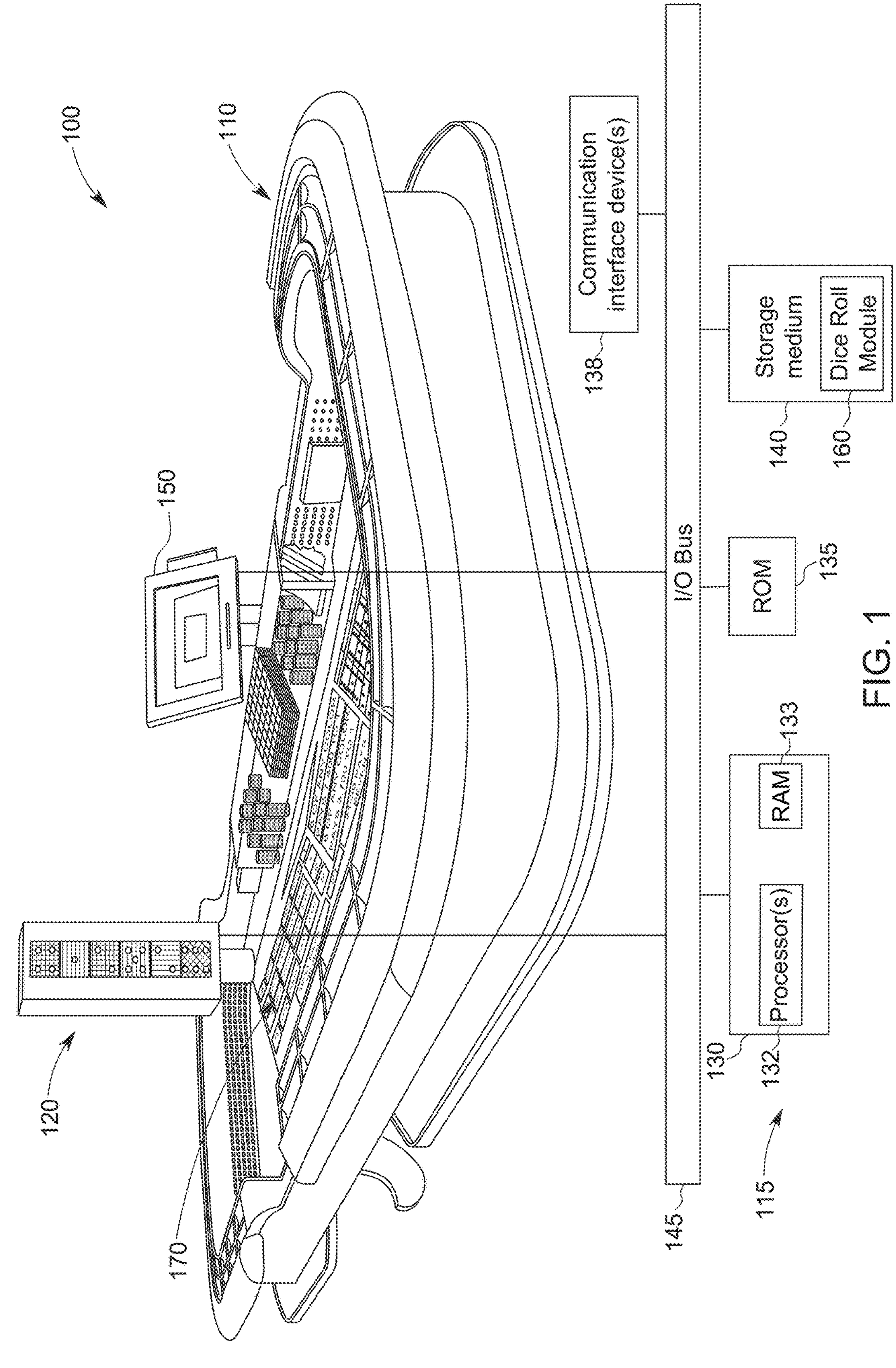
FIG. 1 schematically depicts a gaming system.

Referring to FIG. 1, an embodiment of the gaming system 100 of the present invention is schematically depicted. It comprises a wagering table 110, a dice roll device 120, a controller 115, at least one input device 150, and an electronic simulated dice roll module 160. The controller 115 comprises at least one processing unit 130, read only memory (ROM) 135, and at least one machine-readable storage medium 140, input/output bus 145, communication interface device(s) 138, and other components for its operation (for example, input and output components such as touch screens, keyboard, mouse, etc. which are not depicted in FIG. 1). The controller 115 may be a special purpose or a general purpose computer in some embodiments. The at least one processing unit 130 comprises one or more processors 132 and random access memory (RAM) 133. The controller 115 is capable of receiving signals from the at least one input device 150 and is electronically connected to it through the input/output bus 145. The at least one storage medium 140 stores different software programs and instructions, including the electronic simulated dice roll module 160, and other data. After at least one input device 150, which could comprise a button or a touch input screen or an audio recognition device, communicates a roll command to the controller 115, the at least one processing unit 130 executes the computer instructions contained in the electronic simulated dice roll module 160. As one of its functions, the electronic simulated dice roll module 160 performs the function of a pseudo or true random number generator which randomly selects which dice faces will be electronically communicated to and through the input/output bus 145 and displayed by the dice roll device 120 as winning faces. The dice in the dice roll device 120 may also be implemented as reels with images of different die faces and then reel faces would appear on the vertical or horizontal payline in the dice roll device 120 as winning faces. The electronic simulated dice roll module 160 may also be programmed to select and display different layouts of betting spaces to be displayed in the betting area 170.

The wagering table 110 comprises a betting area 170 on its upper surface which is visible to the public and where players place bets on particular betting spaces. The dice roll device 120 and the at least one input device 150 may be placed on the upper surface or another area of the wagering table 110.

The random number generation in the electronic simulated dice roll module 160 could be implemented in software, hardware, or both, in different embodiments. Random number generation (RNG) could be either true random number generation based on an unpredictable physical phenomenon measured or observed by a device or a pseudo-random number generation based on a formula and a starting number called seed. The true RNG is sometimes called physical or hardware RNG. Physical phenomenon used in such true RNG are, for example, measuring atmospheric noise, thermal noise, and other external electromagnetic and quantum phenomena as sources of natural entropy. Many other parameters could be used in the true RNG such as clock drift, radio noise, radioactive decay, shot noise, and timing of actual movements of a computer hard disk read-write head. For example, one could construct a hardware or true RNG by using two independent clock crystals or crystal oscillators, one that for instance ticks 1000 times per second and one that ticks 1 million times per second. On average the faster crystal will then tick 1,000 times for each time the slower one ticks. But since clock crystals are not precise, the exact number of ticks will vary. That variation can be used to create random bits. For instance, if the number of fast ticks is even, a 0 is chosen, and if the number of ticks is odd, a 1 is chosen. Thus such a 1000/1000000 RNG circuit can produce 1,000 somewhat random bits per second. Antibiasing measures need to be implemented by using algorithms that are well-known in the art since such systems are typically biased.

Another way to build an RNG comprises comparing the timer tick of the operating system (the tick that usually is 100-1000 times per second) and the tick or speed of the CPU. If the OS timer and the CPU run on two independent clock crystals, then this is another variant of the hardware RNG described above. If they both use the same clock crystal, the clock drift measurement is affected by many unpredictable events in the CPU such as interrupts and other processes and programs that run at the same time. Thus, the measurement will still produce acceptable random numbers.

The pseudorandom number generation (PRNG) method uses computational algorithms that can produce long sequences of apparently random results, which are, in fact, completely determined by the formula used, and the seed. One such well-known PRNG method is a linear congruential generator (LCG) which yields a sequence of pseudo-randomized numbers calculated with a discontinuous piecewise linear equation. The LCG is defined by the following recurrence relation:

$$X_{n+1}=(aX_n+c)\bmod m$$

where X is the sequence of pseudorandom values, and n, a, c and m are integer constants that specify the generator.

$m, 0<m$—the "modulus"

$a, 0<a<m$—the "multiplier"

$c, 0\le c<m$—the "increment"

$x_0, 0\le x_0<m$—the "seed" or the "start value"

Various kinds of LNG such as the Lehmer random number generator, the Park—Miller random number generator which is the Lehmer RNG with particular parameters m=231−1=2,147,483,647 and a=75=16,807, and Schrage method are widely used. For example, most computer programming languages provide a standard function rand( ) which software engineers could use to generate a pseudo-random number sequence. For example, the java.util.Random function of the Java programming language uses m=248, a=25214903917 ($5DEECE66D_{16}$), c=11, and output bits of seed are bits 47 . . . 16.

The output of RNG is usually verified for randomness by certain tests for randomness which analyze the distribution of a set of data to see if it can be described as patternless or random. If a selected set of data fails the tests for randomness, then parameters can be changed or other randomized data can be used which does pass the tests for randomness.

Figure 2:
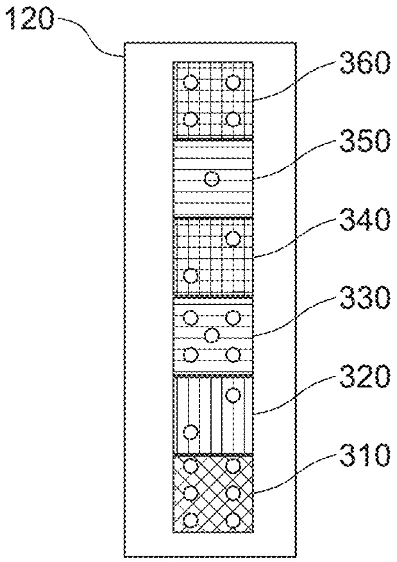
FIG. 2 depicts a dice roll device.

FIG. 2 illustrates one example of the dice roll device 120. In this example, the dice roll device 120 is a tower of six transparent cubes stacked one upon another, each of which has a physical die, an electronic three-dimensional image of a die, a mechanical reel display, or an electronic reel display, or any combination thereof. The rolling or tumbling of a physical die is achieved by well-known methods in the art such as, for example in one embodiment, by blowing air through one or more holes in the transparent cubes under appropriate pressure. The stopping of rolling of the physical die could be achieved by stopping the air flow into the transparent cubes. Care is taken to land the physical die in such a position that the winning face is correctly displayed. Each die has six sides or faces and each side has a mark consisting of dots or pips from 1 to 6, and the number of dots on each side of the same die is different from all the other five sides of the same die. Each side is also colored in a unique color chosen from six pre-selected colors (e.g., red, orange, yellow, green, blue, or violet) so that each side of each die has a unique pre-selected color and no two sides of the same die have the same color. This results in 36 unique color and dot combinations on all six dice.

Figure 3:
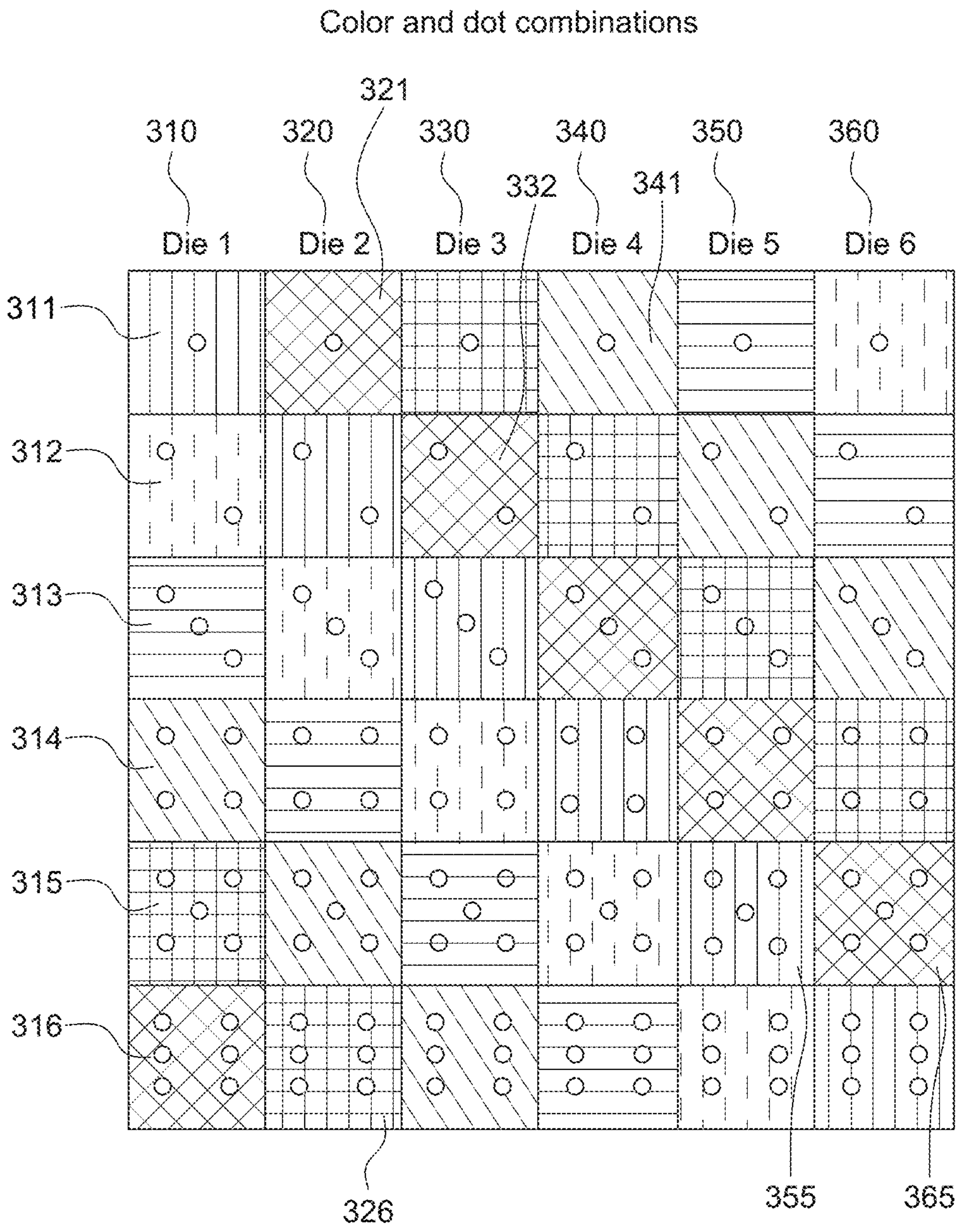
FIG. 3 depicts the color and dot combinations of six dice.

FIG. 3 illustrates the color and dot combinations of six dice of one embodiment of the present invention. For example, the first die 310 has the following: one dot on the red background of the first face 311, two dots on the violet background of the second face 312, three dots on the blue background of the third face 313, four dots on the green background of the fourth face 314, five dots on the yellow background of the fifth face 315, and six dots on the orange background of the sixth face 316.

FIG. 2 depicts one face each of six dice which were selected as a result of the operation of the pseudo random number generation function of the electronic simulated dice roll module 160 as the winning faces, and in this example they are: the first die 310—six dots on orange, the second die 320—two dots on red, the third die 330-five dots on blue, the fourth die 340—two dots on yellow, the fifth die 350—one dot on blue, and the sixth die 360-four dots on yellow. In some embodiments of the present invention, the rolling or tumbling action of the dice shown in the dice roll device 120 may be stopped and winning faces displayed one by one such that first, the first die 310 is stopped and its winning face is displayed, second, the second die 320 is stopped and its winning face is displayed, etc. The order in which the dice are stopped and their winning faces are displayed could be changed from game to game, or less frequently, as desired. The rolling or stopping of individual dice, or all dice together, could be initiated by game players in addition to, or instead of, the dealer. In other embodiments, the tumbling or rolling of all dice may be stopped, and the winning faces displayed, all together.

Figure 4:
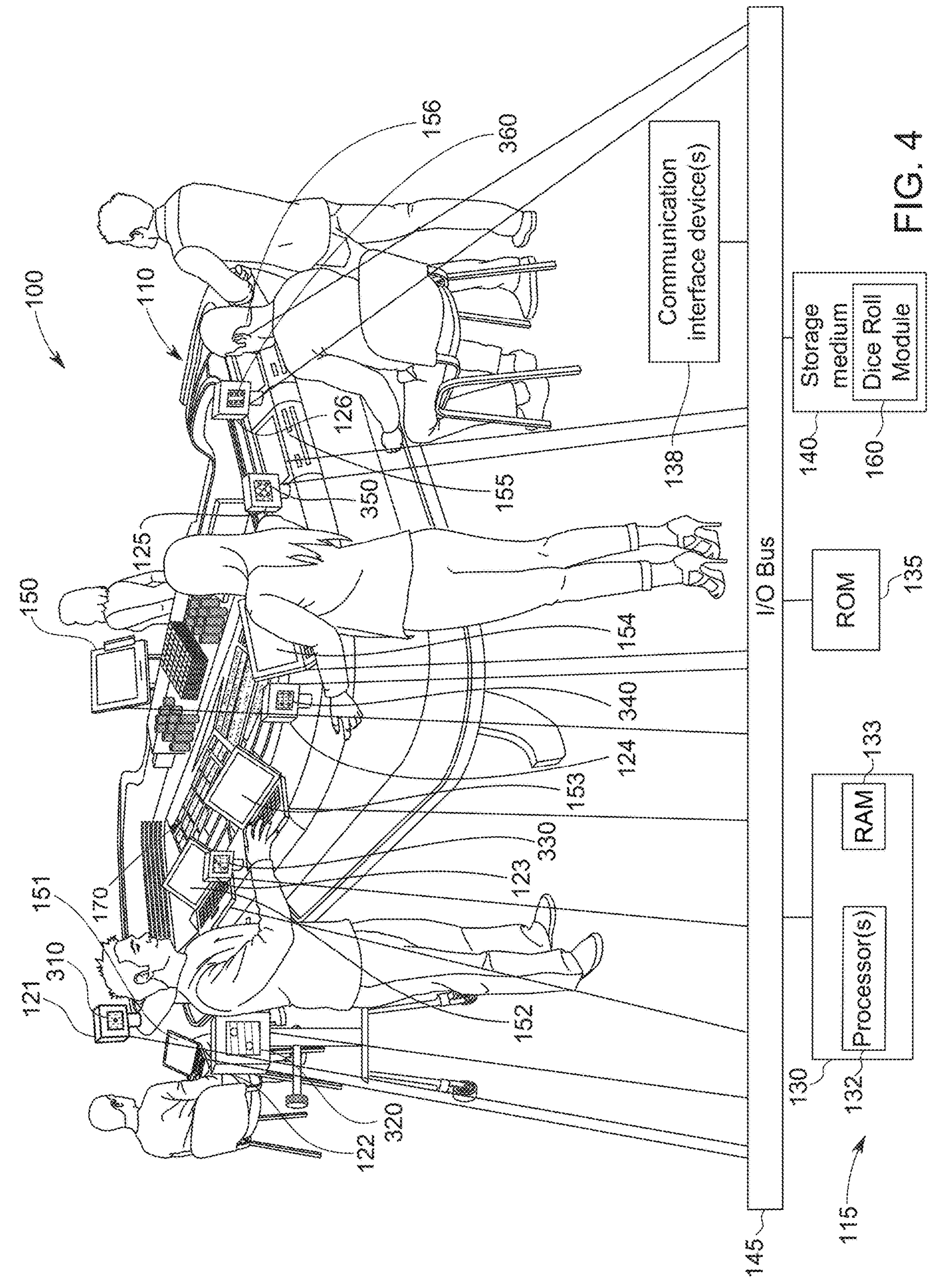
FIG. 4 depicts the gaming system with a player holding an input device and an individual cube dice roll device.

FIG. 4 illustrates another example of the dice roll device 120. In this example, the six transparent cubes are not stacked one upon another, but are separately placed in different locations of the wagering table 110. As illustrated in FIG. 4, in some embodiments of the present invention, individual players may be given a chance to roll an individual die inside an individual cube dice roll device(s) 121-126 by pressing a button on an individual input device(s) 151-156, which could comprise a button or a touch input screen. The individual cube dice roll device 121 contains a physical die 310 or an electronic three-dimensional image of a die 310. The individual cube dice roll device 126 contains a physical die 360 or an electronic three-dimensional image of a die 360. In FIG. 4, a first player is sitting next to the individual cube dice roll device 121 and holding the individual input device 151. A second player (not depicted) is using the individual cube dice roll device 122 (not depicted), which contains a physical die 320 or an electronic three-dimensional image of a die 320 (not depicted), and using the individual input device 152. A third player is using the individual cube dice roll device 123, which contains a physical die 330 or an electronic three-dimensional image of a die 330, and using the individual input device 153. A fourth player is using the individual cube dice roll device 124, which contains a physical die 340 or an electronic three-dimensional image of a die 340, and using the individual input device 154. A fifth player is using the individual cube dice roll device 125, which contains a physical die 350 or an electronic three-dimensional image of a die 350, and using the individual input device 155. A sixth player is standing next to the individual cube dice roll device 126, which contains a physical die 360 or an electronic three-dimensional image of a die 360, and holding the individual input device 156. The dealer has the input device 150, which could transfer control of some aspects of the game to individual player(s) one at a time, or many at a time. In some embodiments, the players may also be given an option to stop the rolling of the dice, initiated by the dealer, by pressing a button on the individual input device(s) 151-156. This makes the game more interactive and may increase player satisfaction.

Figure 8:
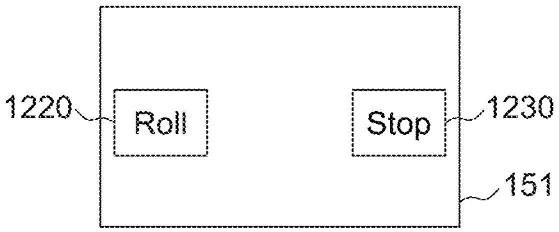
FIG. 8 depicts an individual input device of the gaming system.

FIG. 8 illustrates the individual input device(s) 151-156, which comprises two buttons: Roll button 1220 for a player to initiate rolling of some or all dice, and Stop button 1230 for a player to initiate the stopping of some or all dice.

Figure 5:
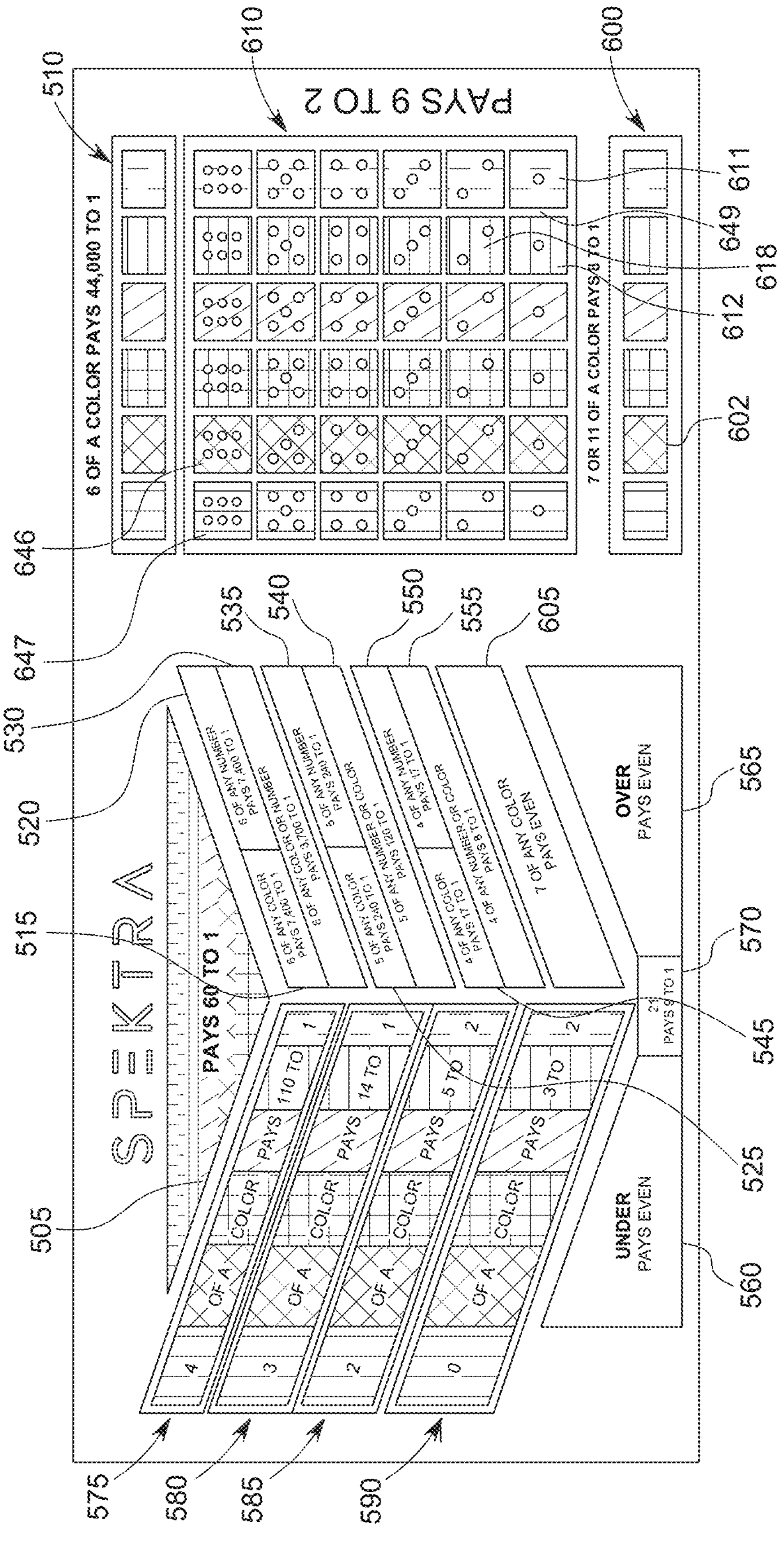
FIG. 5 depicts a betting area.

FIG. 5 illustrates one example of the betting area 170. The betting area 170 may be a tabletop board where different betting spaces are painted or depicted. This tabletop board may be placed on a preexisting table in order to convert it into a wagering table 110, and may be removed if desired. This tabletop board may already comprise the outer surface of the wagering table 110. In other embodiments, the betting area 170 may be an electronic display communicatively coupled to the controller 115, where different betting spaces are displayed electronically and their layout and payout ratios could be changed. The betting area 170 may also be comprised of an electronic display and a board.

In this example, the betting area 170 is divided into 86 different betting spaces for players to place their bets or wagers. The betting area 505 is called "SPEKTRA" which means that a wager placed on the SPEKTRA area 505 wins if after a spin or operation of the pseudo random number generation function of the electronic simulated dice roll module 160, a different color appears on each of the six winning faces on the dice roll device 120. The wager payout ratio in this embodiment for the SPEKTRA area 505 is 60 to 1, which means that a $10 bet placed on the SPEKTRA area 505 wins a payout of $600.

The betting area 510 is called "6 OF A COLOR" which means that a wager placed on the 6 OF A COLOR area 510 wins if after a spin or operation of the pseudo random number generation function of the electronic simulated dice roll module 160, the specified color appears on all 6 winning faces on the dice roll device 120. The 6 OF A COLOR area 510 consists of 6 individual betting areas, each of a different color. The wager payout ratio in this embodiment for the 6 OF A COLOR area 510 is 44,000 to 1, which means that a $10 bet placed on the 6 OF A COLOR area 510 wins a payout of $440,000.

The betting area 515 is called "6 OF ANY COLOR" which means that a wager placed on the 6 OF ANY COLOR area 515 wins if after a spin or operation of the pseudo random number generation function of the electronic simulated dice roll module 160, a like color appears on all 6 winning faces on the dice roll device 120. The wager payout ratio in this embodiment for the 6 OF ANY COLOR area 515 is 7,400 to 1, which means that a $10 bet placed on the 6 OF ANY COLOR area 515 wins a payout of $74,000.

The betting area 520 is called "6 OF ANY NUMBER" which means that a wager placed on the 6 OF ANYNUMBER area 520 wins if after a spin or operation of the pseudo random number generation function of the electronic simulated dice roll module 160, a like number appears on all 6 winning faces on the dice roll device 120. The wager payout ratio in this embodiment for the 6 OF ANY NUMBER area 520 is 7,400 to 1, which means that a $10 bet placed on the 6 OF ANY NUMBER area 520 wins a payout of $74,000.

The betting area 530 is called "6 OF ANY COLOR OR NUMBER" which means that a wager placed on the 6 OF ANY COLOR OR NUMBER area 530 wins if after a spin or operation of the pseudo random number generation function of the electronic simulated dice roll module 160, a like color or number appears on all 6 winning faces on the dice roll device 120. The wager payout ratio in this embodiment for the 6 OF ANY COLOR OR NUMBER area 530 is 3,700 to 1, which means that a $10 bet placed on the 6 OF ANY COLOR OR NUMBER area 530 wins a payout of $37,000.

The betting area 525 is called "5 OF ANY COLOR" which means that a wager placed on the 5 OF ANY COLOR area 525 wins if after a spin or operation of the pseudo random number generation function of the electronic simulated dice roll module 160, a like color appears on at least 5 winning faces on the dice roll device 120. The wager payout ratio in this embodiment for the 5 OF ANY COLOR area 525 is 240 to 1, which means that a $10 bet placed on the 5 OF ANY COLOR area 525 wins a payout of $2,400.

The betting area 535 is called "5 OF ANY NUMBER" which means that a wager placed on the 5 OF ANY NUMBER area 535 wins if after a spin or operation of the pseudo random number generation function of the electronic simulated dice roll module 160, a like number appears on at least 5 reel faces on the dice roll device 120. The wager payout ratio in this embodiment for the 5 OF ANY NUMBER area 535 is 240 to 1, which means that a $10 bet placed on the 5 OF ANY NUMBER area 535 wins a payout of $2,400.

The betting area 540 is called "5 OF ANY NUMBER OR COLOR" which means that a wager placed on the 5 OFANY COLOR OR NUMBER area 540 wins if after a spin or operation of the pseudo random number generation function of the electronic simulated dice roll module 160, a like color or number appears on at least 5 winning faces on the dice roll device 120. The wager payout ratio in this embodiment for the 5 OF ANY NUMBER OR COLOR area 540 is 120 to 1, which means that a $10 bet placed on the 5 OF ANY NUMBER OR COLOR area 540 wins a payout of $1,200.

The betting area 545 is called "4 OF ANY COLOR" which means that a wager placed on the 4 OF ANY COLOR area 545 wins if after a spin or operation of the pseudo random number generation function of the electronic simulated dice roll module 160, a like color appears on at least 4 reel faces on the dice roll device 120. The wager payout ratio in this embodiment for the 4 OF ANY COLOR area 545 is 17 to 1, which means that a $10 bet placed on the 4 OF ANY COLOR area 545 wins a payout of $170.

The betting area 550 is called "4 OF ANY NUMBER" which means that a wager placed on the 4 OF ANY NUMBER area 550 wins if after a spin or operation of the pseudo random number generation function of the electronic simulated dice roll module 160, a like number appears on at least 4 reel faces on the dice roll device 120. The wager payout ratio in this embodiment for the 4 OF ANY NUMBER area 550 is 17 to 1, which means that a $10 bet placed on the 4 OF ANY NUMBER area 550 wins a payout of $170.

The betting area 555 is called "4 OF ANY NUMBER OR COLOR" which means that a wager placed on the 4 OF ANY NUMBER OR COLOR area 555 wins if after a spin or operation of the pseudo random number generation function of the electronic simulated dice roll module 160, a like color or number appears on at least 4 reel faces on the dice roll device 120. The wager payout ratio in this embodiment for the 4 OF ANY NUMBER OR COLOR area 555 is 8 to 1, which means that a $10 bet placed on the 4 OF ANY NUMBER OR COLOR area 555 wins a payout of $80.

The betting area 560 is called "Under" which means that a wager placed on the Under area 560 wins if after a spin or operation of the pseudo random number generation function of the electronic simulated dice roll module 160, the pip count from all 6 winning faces appearing on the dice roll device 120 totals 20 and under. The wager payout ratio in this embodiment for the Under area 560 is 1 to 1, which means that a $10 bet placed on the Under area 560 wins a payout of $10.

The betting area 565 is called "Over" which means that a wager placed on the Over area 565 wins if after a spin or operation of the pseudo random number generation function of the electronic simulated dice roll module 160, the pip count from all 6 winning faces appearing on the dice roll device 120 totals 22 and over. The wager payout ratio in this embodiment for the Over area 565 is 1 to 1, which means that a $10 bet placed on the Over area 565 wins a payout of $10.

The betting area 570 is called "21" which means that a wager placed on the 21 area 570 wins if after a spin or operation of the pseudo random number generation function of the electronic simulated dice roll module 160, the pip count from all 6 winning faces on the dice roll device 120 totals exactly 21. The wager payout ratio in this embodiment for the 21 area 570 is 9 to 1, which means that a $10 bet placed on the 21 area 570 wins a payout of $90.

The betting area 575 is called "4 OF A COLOR" which means that a wager placed on a specified color on the 4 OF A COLOR area 575 wins if after a spin or operation of the pseudo random number generation function of the electronic simulated dice roll module 160, the specified color appears on at least 4 winning faces on the dice roll device 120. The 4 OF A COLOR area 575 consists of 6 individual betting areas each of a different color. The wager payout ratio in this embodiment for the 4 OF A COLOR area 575 is 110 to 1, which means that a $10 bet placed on the 4 OF A COLOR area 575 wins a payout of $1,100.

The betting area 580 is called "3 OF A COLOR" which means that a wager placed on a specified color on the 3 OF A COLOR area 580 wins if after a spin or operation of the pseudo random number generation function of the electronic simulated dice roll module 160, the specified color appears on at least 3 winning faces on the dice roll device 120. The 3 OF A COLOR area 580 consists of 6 individual betting areas each of a different color. The wager payout ratio in this embodiment for the 3 OF A COLOR area 580 is 14 to 1, which means that a $10 bet placed on the 3 OF A COLOR area 580 wins a payout of $140.

The betting area 585 is called "2 OF A COLOR" which means that a wager placed on a specified color on the 2 OF A COLOR area 585 wins if after a spin or operation of the pseudo random number generation function of the electronic simulated dice roll module 160, the specified color appears on at least 2 winning faces on the dice roll device 120. The 2 OF A COLOR area 585 consists of 6 individual betting areas each of a different color. The wager payout ratio in this embodiment for the 2 OF A COLOR area 585 is 5 to 2, which means that a $10 bet placed on the 2 OF A COLOR area 585 wins a payout of $25.

The betting area 590 is called "0 OF A COLOR" which means that a wager placed on a specified color on the 0 OF A COLOR area 590 wins if after a spin or operation of the pseudo random number generation function of the electronic simulated dice roll module 160, the specified color does not appear on any winning face on the dice roll device 120. The 0 OF A COLOR area 590 consists of 6 individual betting areas each of a different color. The wager payout ratio in this embodiment for the 0 OF A COLOR area 590 is 3 to 2, which means that a $10 bet placed on the 0 OF A COLOR area 590 wins a payout of $15.

The betting area 600 is called "7 OR 11 OF A COLOR" which means that a wager placed on a specified color on the 7 OR 11 OF A COLOR area 600 wins if after a spin or operation of the pseudo random number generation function of the electronic simulated dice roll module 160, a pip count total of 7 or 11, from 2 winning faces with the specified color, appears on the dice roll device 120. The 7 OR 11 OF A COLOR area 600 consists of 6 individual betting areas each of a different color. The wager payout ratio in this embodiment for the 7 OR 11 OF A COLOR area 600 is 8 to 1, which means that a $10 bet placed on the 7 OR 11 OF A COLOR area 600 wins a payout of $80.

The betting area 605 is called "7 OF ANY COLOR" which means that a wager placed on the 7 OF ANY COLOR area 605 wins if after a spin or operation of the pseudo random number generation function of the electronic simulated dice roll module 160, a pip count total of 7, from 2 winning faces with any like color, appears on the dice roll device 120. The wager payout ratio in this embodiment for the 7 OF ANY COLOR area 605 is 1 to 1, which means that a $10 bet placed on the 7 OF ANY COLOR area 605 wins a payout of $10.

The betting area 610 is called "EXACT NUMBER AND COLOR" which means that a wager placed on the EXACT NUMBER AND COLOR area 610 wins if after a spin or operation of the pseudo random number generation function of the electronic simulated dice roll module 160, the exact pip count and color appear on one winning face of the dice roll device 120. The EXACT NUMBER AND COLOR area 610 consists of 36 individual betting areas 611 through 647. The wager payout ratio in this embodiment for the EXACT NUMBER AND COLOR area 610 is 9 to 2, which means that a $10 bet placed on the EXACT NUMBER AND COLOR area 610 wins a payout of $45.

The betting area called "DICE GRID/ADJACENT", an example of which is marked 649, means that a wager placed on the DICE GRID/ADJACENT area wins if after a spin or operation of the pseudo random number generation function of the electronic simulated dice roll module 160, one of the two adjoined die on the border between which a wager was placed is a winning face appearing on the dice roll device 120. The wager payout ratio in this embodiment for the DICE GRID/ADJACENT area is 2 to 1, which means that a $10 bet placed on the DICE GRID/ADJACENT area wins a payout of $20. For example, if a player places a bet of $50 on the border between adjoining the betting area 612 (which is 1 dot on the blue background) and the betting area 618 (which is 2 dots on the blue background), and one of the six winning faces is the betting area 612, this player receives a payout of $100. Similarly, if a player places a bet of $200 on the border 649 between adjoining the betting area 612 and the betting area 611 (which is 1 dot on the purple background), and one of the six winning faces is the betting area 611, this player receives a payout of $400.

Figure 6:
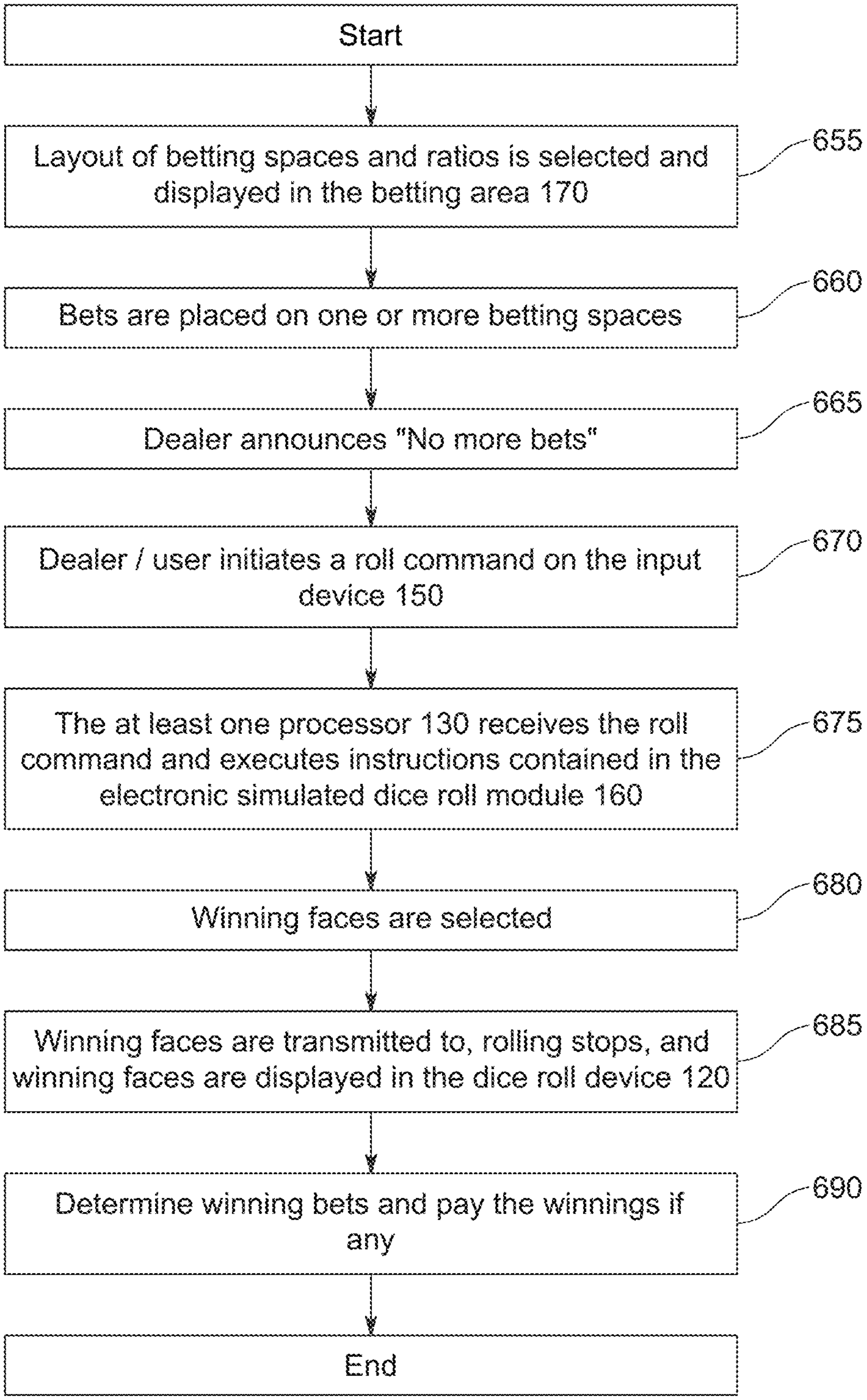
FIG. 6 is a flow chart of steps of the method of playing the game.

FIG. 6 is a flow chart illustrating the steps of playing an exemplary embodiment of the game of the present invention. At step 655, the dealer, through the at least one input device 150, electronically selects the layout of FIG. 5 for this game, which is then caused by the at least one processing unit 130 to be displayed as the betting area 170 on the wagering table 110. Two players, Jane and Rosa, are at the wagering table 110 and, at step 660, place their bets of $25 on the orange area 602 of the 7 OR 11 OF A COLOR area 600 and $50 on the betting area 646 (which is 6 dots on the orange background) of the EXACT NUMBER AND COLOR area 610 respectively. At step 665, the dealer announces, "No more bets", and closes the betting with just two bets placed as described above. At step 670, the dealer initiates a roll command on the at least one input device 150.

At step 675, the at least one processing unit 130 of the controller 115 receives the roll command and executes instructions stored in and loaded from the electronic simulated dice roll module 160, which runs the pseudo random number generator, including displaying of rolling of electronic three-dimensional images of dice. At step 680, the pseudo random number generator of the electronic simulated dice roll module 160 selects the following winning faces: first die 310—the third face 313, which is three dots on the blue background; second die 320—the sixth face 326, which is six dots on the yellow background; the third die 330—the second face 332, which is two dots on the orange background; the fourth die 340—the first face 341, which is one dot on the green background; the fifth die 350—the fifth face 355, which is five dots on the red background; and the sixth die 360—the fifth face 365, which is five dots on the orange background. At step 685, the controller 115 transmits the above winning faces to the dice roll device 120, which stops displaying the rolling or tumbling of the dice 310 and 320 first and displays winning faces 313 and 326, while continuing to show the rolling or tumbling of dice 330, 340, 350, and 360. Then it stops displaying the rolling or tumbling of the dice 350 and 360 and displays winning faces 355 and 365. Lastly, the dice roll device 120 stops displaying the rolling or tumbling of the dice 330 and 340 and displays winning faces 332 and 341. At step 690, the dealer determines the winning bets and pays the winnings, if any. In this example, Rosa bet $50 on the betting area 646 (which is 6 dots on the orange background) which was not a winning bet since face 316 of the first die 310 (which is 6 dots on the orange background) was not pseudo randomly selected. Rosa loses her $50. Jane wagered $25 on the orange area 602 of the 7 OR 11 OF A COLOR area 600 and wins her bet because the sum of the winning faces 332 and 365 having the orange background is 7. Rosa receives a payout of $200.

Figure 7:
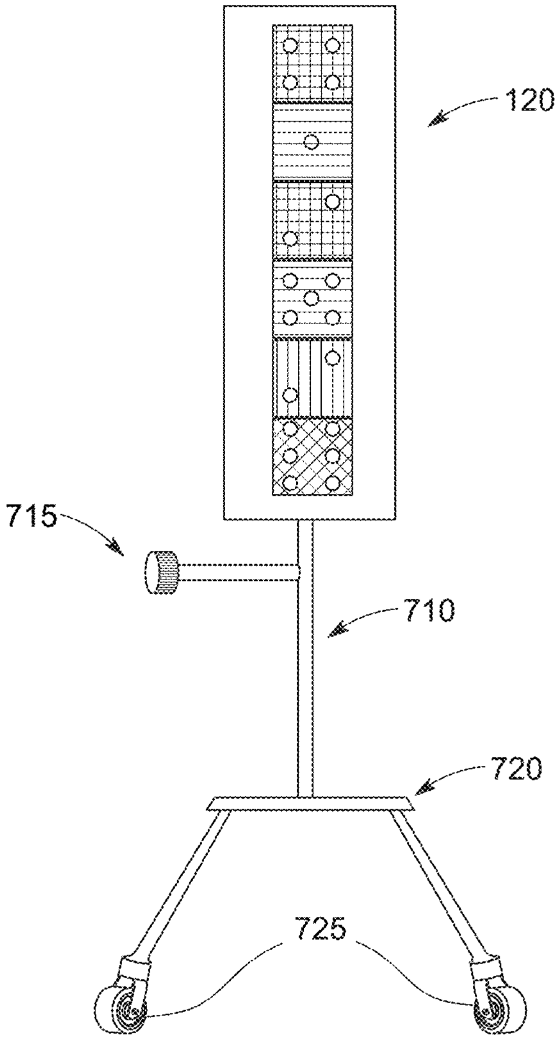
FIG. 7 depicts a different embodiment of the dice roll device.

As illustrated in FIG. 7, in some embodiments of the present invention the dice roll device 120 may be mounted on a stand or a pole 710 with a rolling base 720 with wheels 725 and is movable so that it could be moved between gambling tables and/or could be positioned in proximity or next to any person at the gambling table, be it a player, dealer, or spectator. The pole 710 could be vertically adjustable so that the dice roll device 120 could be lowered or brought up on the pole 710, and securely held in its position by a knob or a screw 715, and/or could also be removed from the pole 710 and placed on top of the wagering table 110.

Figure 9:
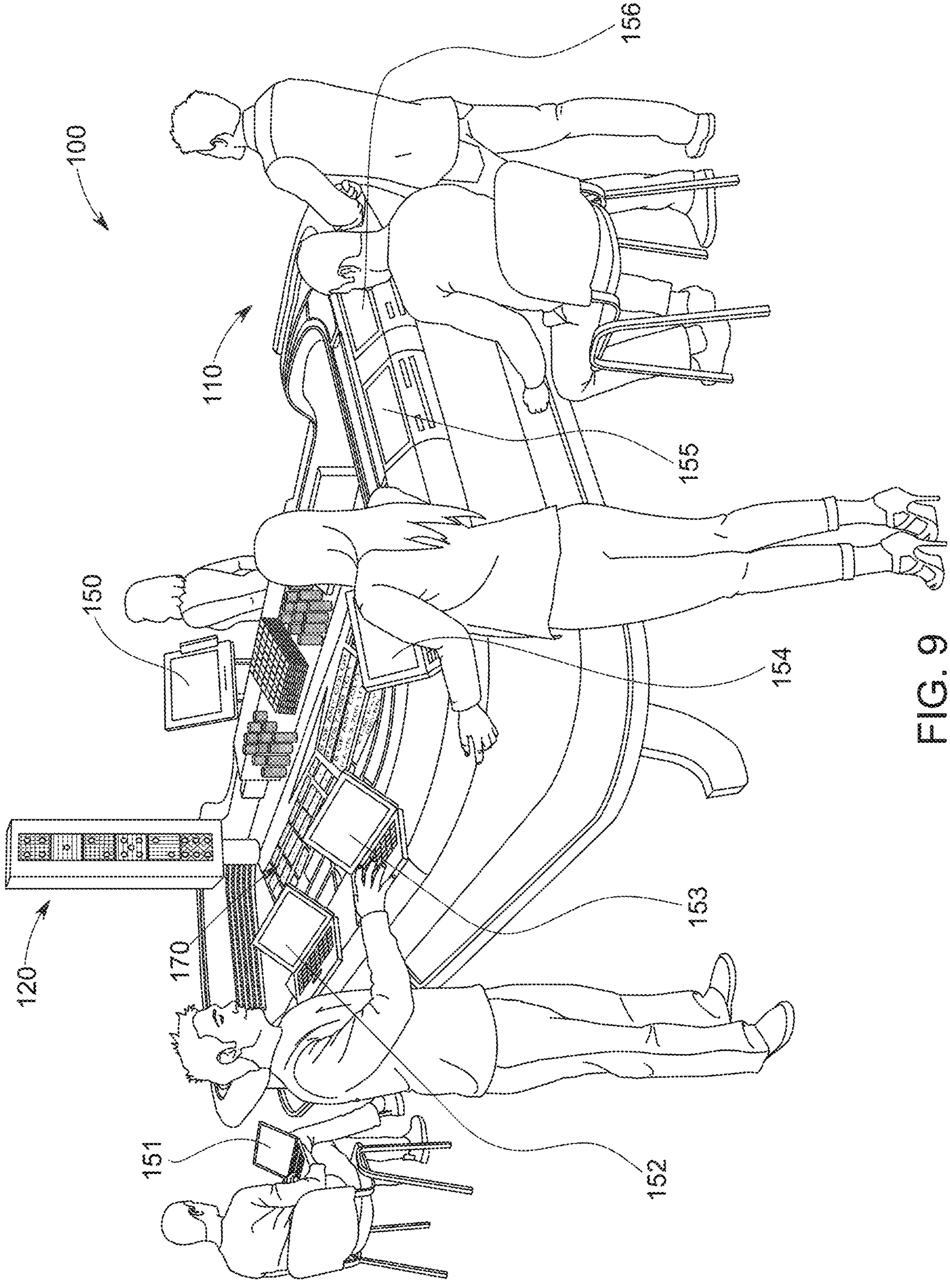
FIG. 9 depicts the gaming system with a player holding an input device.

As illustrated in FIG. 9, in other embodiments of the present invention, two players, Jack and Ryan, among others, are at the wagering table 110. Jack is holding the individual input device 151 and Ryan is using the individual input device 156. Returning to the flow chart of FIG. 6, at step 670 the dealer gives control of the rolling to Jack, and Jack is allowed to press the input device 151 to initiate a roll command of the six dice contained or displayed in the dice roll device 120. At step 680, the pseudo random number generator of the electronic simulated dice roll module 160 selects the winning faces. In step 685, the dealer gives control of the stopping function to Ryan, and Ryan is allowed to press the input device 156 to stop the rolling or tumbling of six dice and to display their winning faces. Other variations of initiating and stopping the rolling and selection of the winning faces by players are possible.

Figure 10:
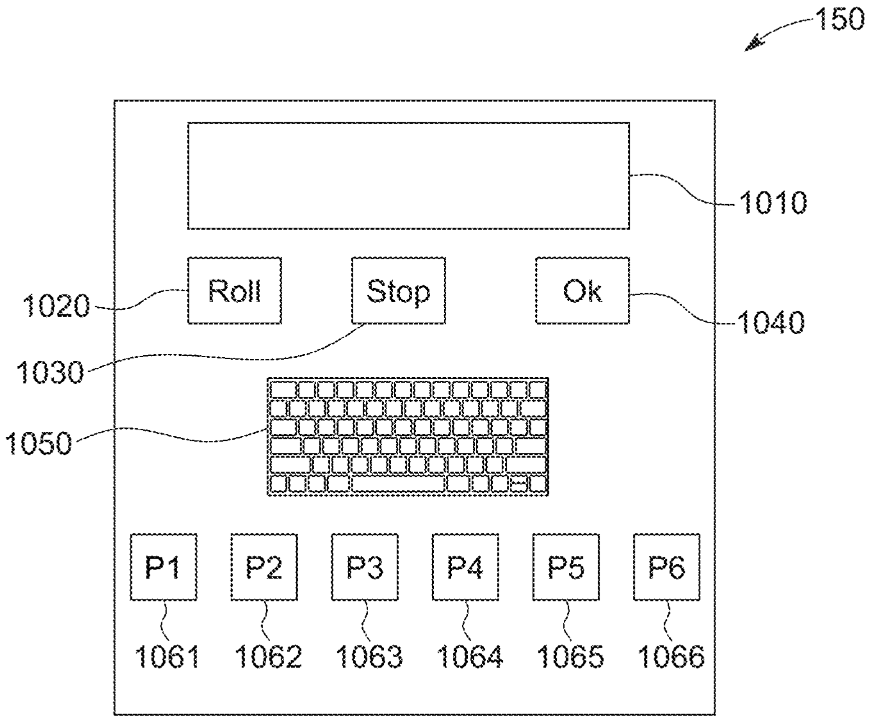
FIG. 10 depicts at least one input device of the gaming system.

As illustrated in FIG. 10, in an exemplary embodiment of the present invention the at least one input device 150 consists of a screen 1010, Roll button 1020, Stop button 1030, OK button 1040, keyboard 1050, P1 button 1061, P2 button 1062, P3 button 1063, P4 button 1064, P5 button 1065, and P6 button 1066. The Roll button 1020 is pressed by the dealer to initiate rolling of the dice. The Stop button 1030 is pressed by the dealer to stop the rolling of the dice. The OK button 1040 is pressed by the dealer to confirm the command she initiated. The keyboard 1050 may be an ASCII keyboard and is used by the dealer to issue commands, such as to select the layout of the betting area 170 on the wagering table 110, to issue roll or stop commands, or to transfer control to a player. The screen 1010 displays commands and other images. The P1 . . . P6 buttons 1061-1066 are pressed by the dealer to transfer control individually to individual players. In one embodiment of the present invention, one pressing of the P1 button (with subsequent confirmation of the command) transfers control of the roll function of the dice to the first player. The second pressing of the P1 button (with subsequent confirmation of the command) transfers control of the stop function of the dice to the first player. The at least one input device 150 could also be used, for example, to communicate with management of the casino, or display images or video from security cameras to prevent cheating by players. The at least one input device 150 could be implemented as a tablet, laptop, or smartphone displaying the buttons on their screen, or as a special device with physical buttons, etc.

Figure 11:
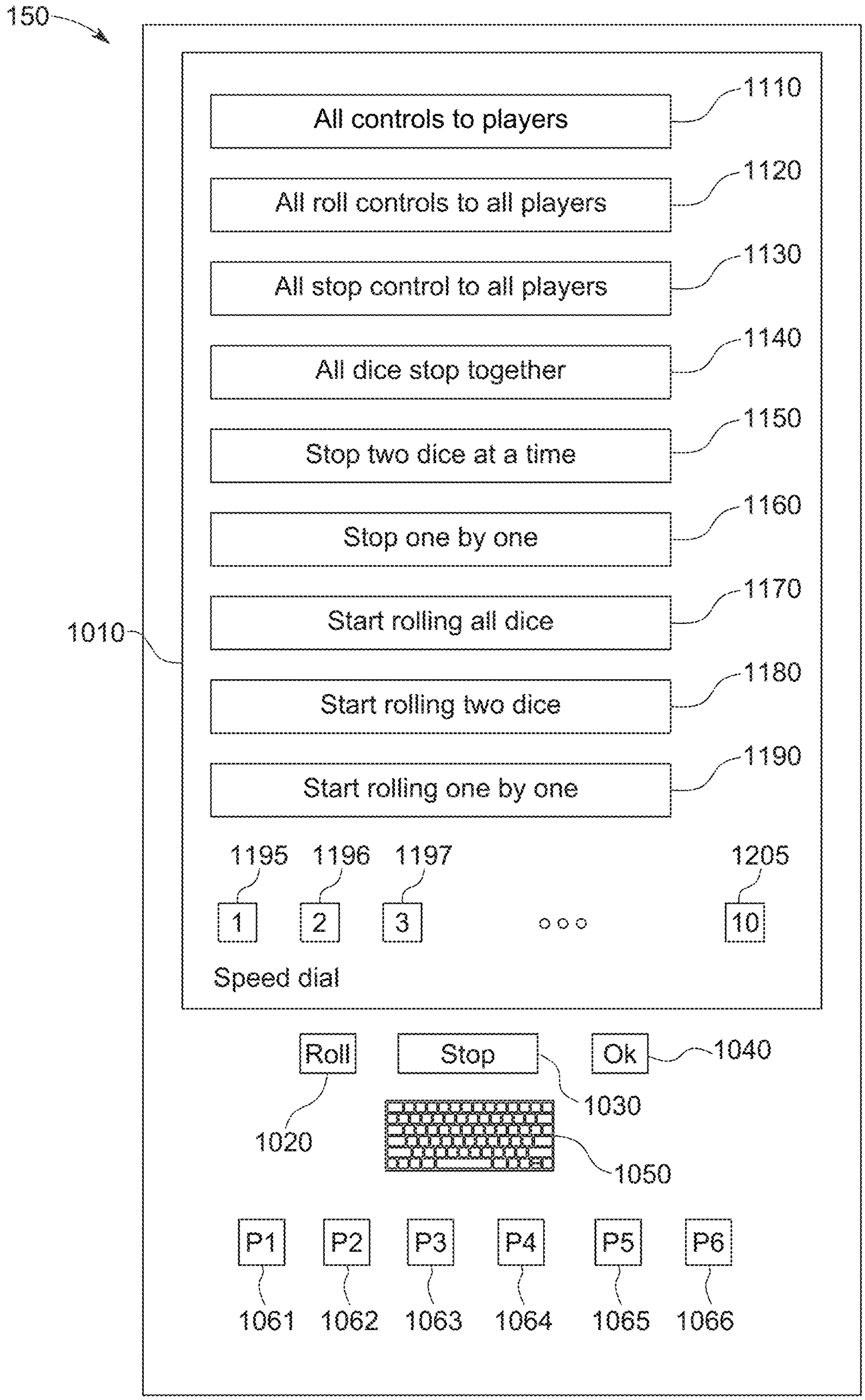
FIG. 11 depicts a menu of options for the dealer operating the gaming system.

In order to access other game options, the dealer could press and hold the Roll button 1020 for 2 seconds and a menu illustrated in FIG. 11 would appear on the screen 1010. Pressing the virtual button or choice 1110 named "All control to all players" transfers all control of the rolling and stopping functions of the dice simultaneously to all players. Pressing the virtual button or choice 1120 named "All roll control to all players" transfers only roll control to all players simultaneously. Pressing the virtual button or choice 1130 named "All stop control to all players" transfers only stop control to all players simultaneously.

Pressing the virtual button or choice 1140 named "All dice stop together" selects an option for all dice to stop rolling together. After this option is selected, it is saved in the at least one storage medium 140. When the dealer later presses the Stop button 1030 during play, all dice are stopped together. Pressing the virtual button or choice 1150 named "Stop two dice at a time" selects an option for a pair of dice to stop at a time when the dealer later presses the Stop button 1030. (For example, referring back to FIG. 6, when the dealer selected the virtual button or choice 1150 named "Stop two dice at a time," at step 685, the controller 115 transmits the winning faces to the dice roll device 120, which stops displaying the rolling or tumbling of the dice 310 and 320 first and displays their winning faces, for example, winning faces 313 and 326, while continuing to show the rolling or tumbling of dice 330, 340, 350, and 360. Then it stops displaying the rolling or tumbling of the dice 350 and 360 and displays their winning faces, for example, winning faces 355 and 365. Lastly, the dice roll device 120 stops displaying the rolling or tumbling of the dice 330 and 340 and displays their winning faces, for example, winning faces 332 and 341.

Pressing the virtual button or choice 1160 named "Stop One by One" selects an option for all dice to stop one by one in a preselected order, which also could be selected by the dealer out of a menu of options shown to the dealer when she selects the virtual button or choice 1160. Such stopping options could be ascending order, descending order, ascending odd first, descending even first, random, etc. After this option is selected, it is saved in the at least one storage medium 140. When the dealer later presses the Stop button 1030 during play, all dice are stopped one by one.

Pressing the virtual button or choice 1170 named "Start rolling all dice" selects an option for all dice to start rolling together. After this option is selected, it is saved in the at least one storage medium 140. When the dealer later presses the Roll button 1020 during play, all dice start rolling together. Pressing the virtual button or choice 1180 named "Start rolling two dice" selects an option to roll just a pair of dice at a time. After this option is selected, it is saved in the at least one storage medium 140. When the dealer later presses the Roll button 1020 during play, two dice at a time start rolling together. For example, first die 310 and fourth die 340 could be rolled together first. Then the second die 320 and the third die 330 could start rolling together. Pressing the virtual button or choice 1190 named "Start rolling one by one" selects an option for all dice to start rolling one by one in a preselected order, which also could be selected by the dealer out of a menu of options shown to the dealer when she selects the virtual button or choice 1180. Such rolling options could be ascending order, descending order, ascending odd first, descending even first, random, etc. After this option is selected, it is saved in the at least one storage medium 140. When the dealer later presses the Roll button 1020 during play, all dice start rolling one by one.

All control options could persist from play to play until changed by the dealer. A preselected menu of combinations or sequences of different options for plays could be saved as a speed dial function and activated by pressing one key. For example, referring back to FIG. 11, the speed dial virtual button or choice 1195 is labeled "1" and stores, and initiates upon its selection, the following sequence of plays: Play 1—all dice roll and stop together; Play 2—all dice roll together but stop one by one; Play 3—the first player is given control to roll all dice together and they stop two at a time; Play 4—dice start rolling one by one and the sixth player is given control to stop all dice. The speed dial virtual button or choice 1205 is labeled "10" and stores, and initiates upon its selection, the following sequence of plays: Play 1—each player is given control to roll his/her individual die and all dice stop together; Play 2—each player is given control to roll his/her individual die and control to stop his/her individual die; etc.

The following recitation relates to the dealer's commands to implement the steps of the flow chart of FIG. 6. At step 655, the dealer, through pressing the buttons of the keyboard 1050, displays a command to select the betting layout on the screen 1010. By executing this command, the dealer is then given a choice of layouts of the betting area 170 of the wagering table 110. In this example, the dealer chooses the layout of FIG. 5 for this game which is then caused by the at least one processing unit 130 to be displayed as the betting area 170 on the wagering table 110. Also at step 655, the dealer is shown a menu of options illustrated in FIG. 11 and selects the virtual button or choice 1170 named "Start rolling all dice" and the virtual button or choice 1150 named "Stop two dice at a time" and presses the OK button 1040 to confirm his selection. At step 660, players place their bets. At step 665, the dealer announces, "No more bets", and closes the betting with just two bets placed as described above. At step 670, the dealer initiates a roll command on the at least one input device 150 by pressing the Roll button 1020 and confirming this command by pressing the OK button 1040, and all dice start rolling simultaneously (according to the previously selected choice 1170 named "Start rolling all dice").

At step 680, the pseudo random number generator of the electronic simulated dice roll module 160 selects the winning faces of the dice. At step 685, the dealer presses the Stop button 1030 and the controller 115 transmits the selected winning faces to the dice roll device 120, which stops displaying the rolling or tumbling of dice 310 and 320 first and displays their winning faces, for example, winning faces 313 and 326, while continuing to show the rolling or tumbling of dice 330, 340, 350, and 360. Then it stops displaying the rolling or tumbling of dice 350 and 360 and displays their winning faces, for example, winning faces 355 and 365.

Lastly, the dice roll device 120 stops displaying the rolling or tumbling of dice 330 and 340 and displays their winning faces, for example, winning faces 332 and 341. At step 690, the dealer determines the winning bets and pays the winnings if any.

Returning to FIG. 1, the one or more processors 132 may be in a form of a central processing unit (CPU); a multiprocessor unit (MPU); an ARM processor; a controller; a programmable logic device; or a similar device. In some embodiments, the at least one processing unit 130 includes one or more processors operatively connected to one or more of a RAM, ROM, and machine-readable storage medium. The one or more processors of the at least one processing unit 130 receive instructions stored by the one or more of a RAM, ROM, and machine-readable storage medium via a bus, and the one or more processors execute the received instructions. In some embodiments, the at least one processing unit 130 is an ASIC (Application-Specific Integrated Circuit) or a SoC (System-on-Chip). Examples of input devices 150 and individual input devices 151-156 include tactile devices such keyboards, keypads, foot pads, touch screens, and/or trackballs; non-contact devices such as audio input devices; motion sensors and motion capture devices that the controller 115 can use to receive inputs from a user when the user interacts with the controller 115; physiological sensors that monitor the physiology of the user; environmental sensors, accelerometers, or location sensors that monitor the physical environment of the controller 115.

The communication interface devices 138 provide one or more wired or wireless interfaces for communicating data and commands between the controller 115 and other devices that may be included in the gaming system 100. Such wired and wireless interfaces include, but are not limited to: a Universal Serial Bus (USB) interface, a Bluetooth interface, a Wi-Fi interface, an Ethernet interface, a Near Field Communication (NFC) interface, a plain old telephone system (POTS) interface, a cellular or satellite telephone network interface, and the like.

In various embodiments, the at least one machine-readable storage medium 140 is one of a (or a combination of two or more of) a hard drive, a flash drive, a DVD, a CD, a flash storage, a solid state drive, a ROM, an EEPROM, and the like, and removable media such as, but not limited to, a USB memory device, an optical CD ROM, magnetic media such as tape and disks, and the like.

The at least one machine-readable storage medium 140 stores machine-executable instructions for various components of the controller 115, such as but not limited to: an operating system, one or more device drivers, one or more application programs including but not limited to an interactive application, and an electronic simulated dice roll module and data for use by the one or more processors 132 to provide the features of a controller as described herein. In operation, the machine-executable instructions are loaded into RAM 133 from the at least one machine-readable storage medium 140, the ROM 135 or any other storage location. The respective machine-executable instructions are accessed by the one or more processors 132 via the bus 145, and then executed by the one or more processors 132. Data used by the one or more processors 132 are also stored in RAM 133, and the one or more processors 132 access such data during execution of the machine-executable instructions. Execution of the machine-executable instructions causes the one or more processors 132 to control the controller 115 to provide the features as described herein.

Figure 12:
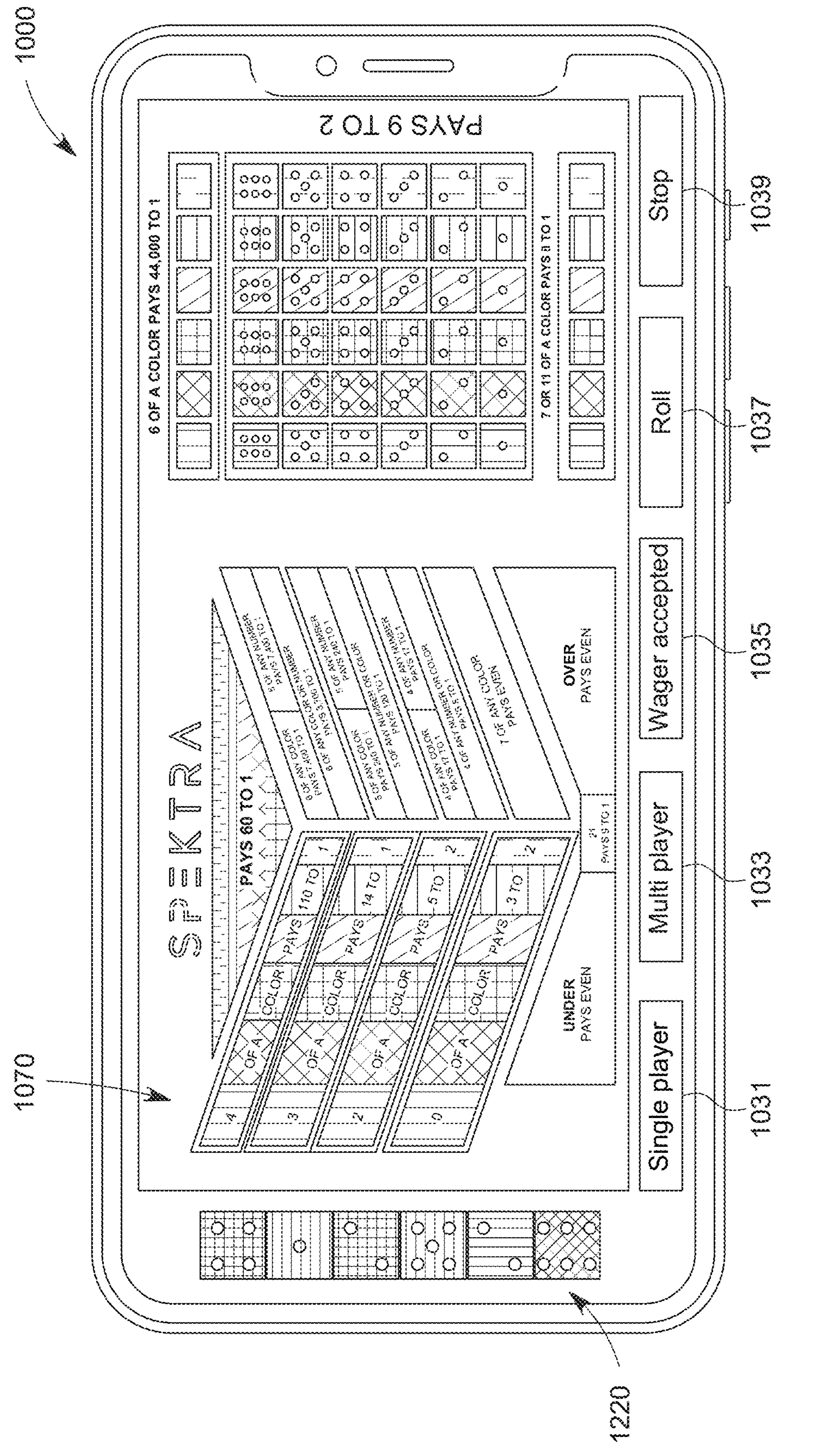
FIG. 12 depicts a smart phone displaying a betting area and other features of the gaming system.

In another embodiment, the gaming system of the present invention maybe implemented as a mobile software application which could be played by one or more users on their computers, laptops, tablets, smart phones, smart TVs, dedicated gaming systems or consoles, and other electronic devices, by downloading them or playing over the Internet or another network connection on the server where such games are stored. In the software embodiment, some of the previously described elements appear on the screen of an electronic device, virtually. FIG. 12 shows a smart phone displaying a betting area and other features of one embodiment of the gaming system 1000 of the present invention. The smart phone displays a betting area 1070 which is a depiction of the betting area 170 of FIG. 5. The smart phone also displays a depiction of dice roll device 1220 which is an electronic version of the dice roll device 120. The smart phone also displays several buttons such as Single Player button 1031, Multiple Player button 1033, Wager Accepted button 1035, Roll button 1037, and Stop button 1039.

Figure 13:
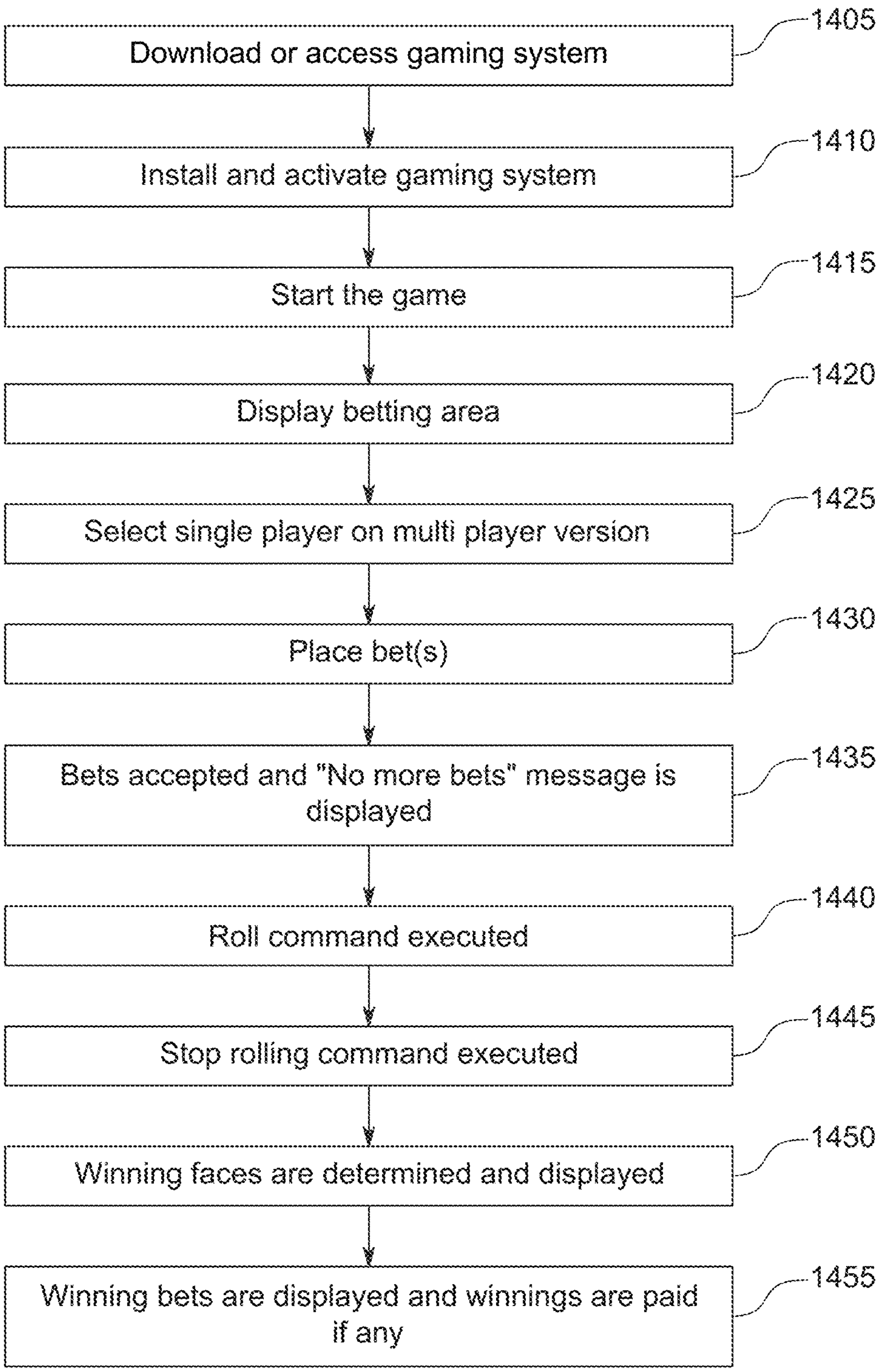
FIG. 13 is a flow chart illustrating the steps of downloading the gaming system

FIG. 13 is a flow chart illustrating the steps of downloading one embodiment of the gaming system 1000 of the present invention and playing it. At step 1405, a player or a user downloads the game software from a website, mobile app store like App Store or Google Play Store, or accesses it over the Internet at a website hosting it. At step 1410, the downloaded game software is installed and activated onto the player's smart phone or another mobile computing device by authenticating the player, establishing or logging into the user's account, and selecting an appropriate financial account, e.g., credit card, bank account, etc., to place wagers for the game. At step 1415, the user starts the game by clicking on the game icon displayed on the smart phone or the Start button displayed on the game home screen. At step 1420, the software displays the betting area 1070 on the smart phone screen as shown in FIG. 12. At step 1425, the player presses either the Single Player button 1031 to select a single player game, or Multiple Player button 1033 to select the multi-player game. At step 1430, each player places her bets on particular betting areas. Each betting area corresponding to betting areas 505-647 are presented as touch buttons on the screen. (They could also be presented as a scroll down menu or toggle buttons, for example.) When a user selects a touch button, the game software asks the player how much the bet is, deducts that amount from the user financial accounts, and records this bet. At step 1435, the gaming software locks the field and displays the "No more bets" message to all players. At step 1440, the software, or one or more players, execute the roll of the dice command (by pressing the Roll button 1037) and the dice roll device 1220 shows images of six dice spinning. At step 1445, the software, or one or more players, execute the stop rolling command (by pressing the Stop button 1039) and the dice roll device 1220 stops the rolling of the dice. At step 1450, the game software determines and displays the winning faces on the dice roll device 1220. At step 1455, the game software determines the winning bets and pays the winning to the player(s).

Figure 14:
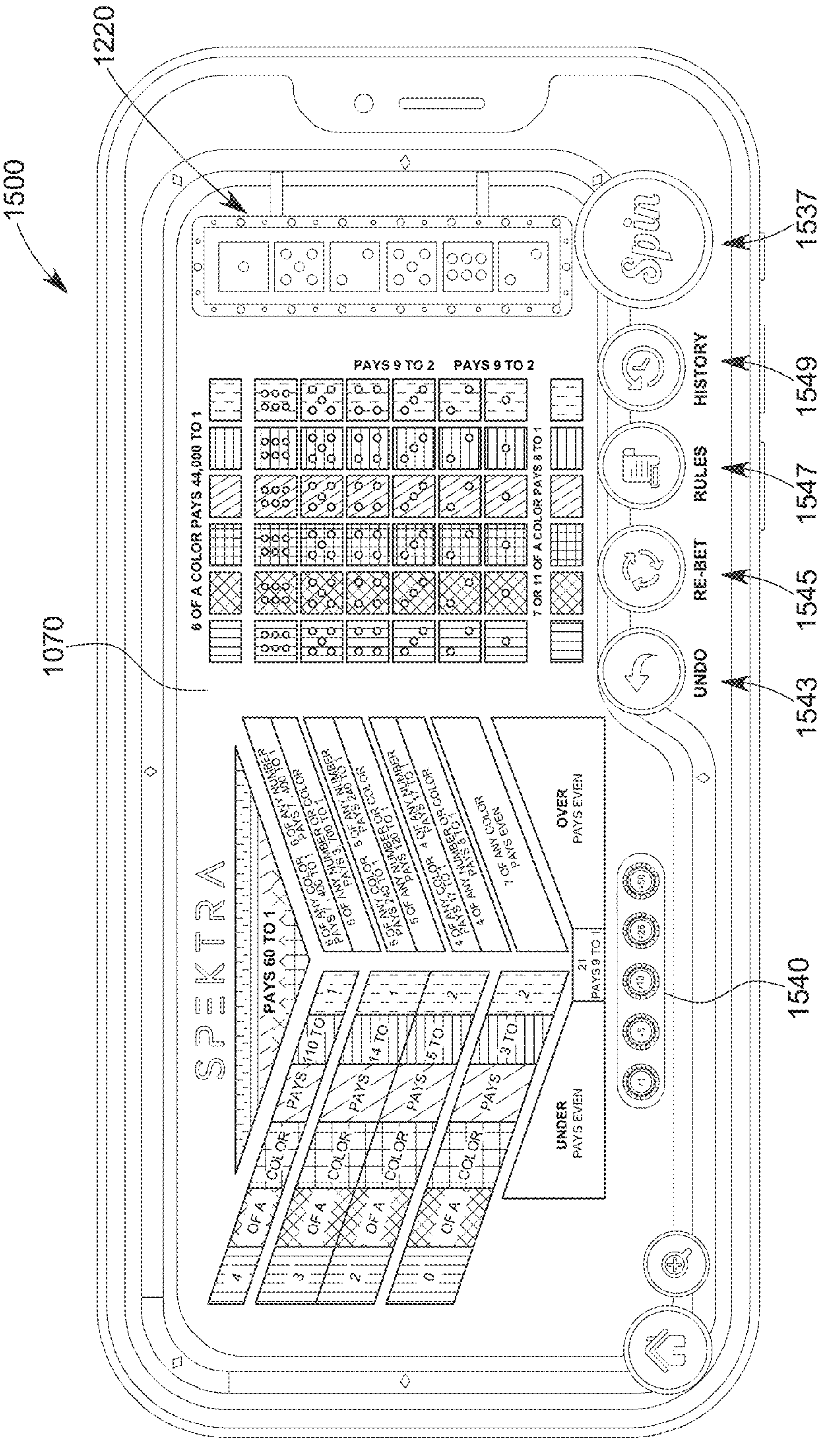
FIG. 14 depicts a smart phone displaying another embodiment of a betting area and other features of the gaming system.

FIG. 14 shows a smart phone displaying a betting area and other features of another embodiment of a single-player game of the gaming system of the present invention. The smart phone displays a gaming system 1500 with a betting area 1070 which is a depiction of the betting area 170 of FIG. 5. The smart phone also displays a depiction of dice roll device 1220 which is an electronic version of the dice roll device 120. The smart phone also displays several buttons such as Undo button 1543, Re-bet button 1545, Rules button 1547, History button 1549, and Spin button 1537. The smart phone also displays several chips in the area 1540 for the player to choose the betting amount from. In this embodiment, pressing History button 1549 displays the history of the players bets and game outcomes as many players like to analyze their performance and plan for future bets in a reasoned way. Pressing Rules button 1547 displays the rules of the game to the player, including permissible bets, betting odds, and other information related to the gaming system 1500. Pressing Re-bet button 1545 selects a previously placed bet to be placed again with or without changes. Pressing Undo button 1543 stops execution of the previous command issued by the player.

Figure 15:
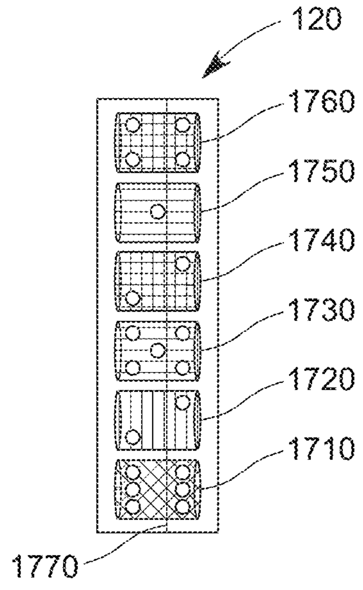
FIG. 15 depicts a different embodiment of a dice roll device.

FIG. 15 depicts another embodiment of the dice roll device 120 where individual dice are implemented as reels with images of different die faces. For example, FIG. 15 shows one reel face each of six reels which were selected as a result of the operation of the pseudo random number generation function of the electronic simulated dice roll module 160 as the winning reel faces, and in this example they are: the first reel 1710—six dots on orange, the second reel 1720—two dots on red, the third reel 1730—five dots on blue, the fourth reel 1740—two dots on yellow, the fifth reel 1750—one dot on blue, and the sixth reel 1760—four dots on yellow. The above winning reel faces that are visible to the players are said or deemed to appear on the imaginary or actual vertical payline 1770 of the dice roll device 120. Each reel contains six images of die faces as depicted in FIG. 3. For example, the first reel 1710 contains 6 images of the die faces 311 through 316 of the first die 310 of FIG. 3. The second reel 1720 contains 6 images of the die faces 321 through 326 of the second die 320 of FIG. 3. Reels could also be used in other embodiments of the dice roll device 120 such as the ones described and depicted in FIG. 4.

What is claimed is:

1. A gaming system comprising:

a dice roll device comprising at least six dice with six faces each, wherein the faces have two identifiers, and each of the at least six dice are disposed in a separate compartment of the dice roll device;

a wagering table displaying a plurality of betting areas, and the dice roll device disposed on the wagering table; and at least one input device electronically connected to the dice roll device and capable of initiating and stopping rolling of the at least six dice in the dice roll device.

2. The system of claim 1, wherein the at least one input device is selected from a lever, a button, a switch, a tablet computer, or a smart phone.

3. The system of claim 1, wherein the plurality of betting areas equals 86 and at least one of the plurality of betting areas has an associated payout ratio of 44,000 to 1.

4. The system of claim 1, wherein the plurality of betting areas has at least 7 betting areas with an associated payout ratio of greater than 100 to 1.

5. The system of claim 1, wherein the two identifiers comprise a first group of identifiers comprising dots from one to six and a second group of identifiers comprising six preselected colors.

6. The system of claim 1, further comprising a rolling apparatus capable of receiving commands from the at least one input device, the rolling apparatus connected to the dice roll device and capable of starting and stopping rolling of the at least six dice in the dice roll device.

7. The system of claim 1, wherein the at least one input device further comprises one input device per player.

8. The system of claim 1, wherein the at least six dice have unique faces such that no combination of the two identifiers is repeated on any of the at least six dice.

9. A gaming system comprising:

at least six dice each contained in one of at least six dice roll devices, the dice roll devices comprising at least one compartment designed to contain a die, and each die containing six faces, wherein each of the six faces has two identifiers;

a wagering table displaying a plurality of betting areas, and the at least six dice roll devices disposed on the wagering table;

a computer comprising a processor and a memory, the computer electronically connected to the at least six dice roll devices, wherein the memory stores a series of instructions that, when executed by said processor, cause the processor to:

display rolling of the at least six dice in the at least six dice roll devices;

select one winning face for each of the at least six dice;

transmit the one winning face for each of the at least six dice to the at least six dice roll devices;

stop rolling of the at least six dice in the at least six dice roll devices; and display the one winning face for each of the at least six dice in the at least six dice roll devices; and at least one input device electronically connected to one of the at least six dice roll devices and capable of initiating and stopping rolling of the at least six dice in the at least six dice roll devices.

10. The system of claim 9, wherein each of the at least six dice comprise an electronic three-dimensional image of a die.

11. The system of claim 9, wherein the at least one input device comprises six input devices each electronically connected to a separate one of the at least six dice roll devices.

12. The system of claim 9, wherein the select one winning face is performed randomly or pseudo randomly.

13. The system of claim 9, wherein the select one winning face is performed by a pseudo random number generator.

14. The system of claim 9, wherein the stop rolling step further comprises stopping each of the at least six dice individually in a predetermined order.

15. The system of claim 14, wherein the predetermined order is selected from the group of: stopping dice individually in ascending order, stopping dice individually in descending order, stopping dice by pairs, random order, or stopping dice individually in ascending order of odd numbered dice.

16. The system of claim 14, wherein the memory stores a series of instructions that, when executed by the processor, cause the processor to further:

create a sequence of instructions causing the processor to:

at a first play, start rolling and stop rolling of the at least six dice together;

at a second play, start rolling the at least six dice together and to stop the at least six dice one by one; and at a third play, receive a start rolling command for the at least six dice together from a first player through the at least one input device and to stop the at least six dice two at a time.

17. A gaming system comprising:

a dice roll device comprising at least six displays of images of at least six dice with six faces each, wherein the faces have two markings each selected from at least two groups of identifiers;

a wagering table displaying a plurality of betting areas, and the dice roll device disposed on the wagering table;

a computer comprising a processor and a memory, the computer electronically connected to the dice roll device, wherein the memory stores a series of instructions that, when executed by the processor, cause the processor to:

display rolling of the at least six dice in the dice roll device;

select one winning face for each of the at least six dice;

transmit the one winning face for each of the at least six dice to the dice roll device; Stop rolling of the at least six dice in the dice roll device; and display said one winning face for each of the at least six dice in the dice roll device; and at least one input device disposed on the wagering table, the at least one input device electronically connected to the dice roll device and to the computer, and the at least one input device capable of initiating and stopping rolling of the at least six dice in the dice roll device.

18. The system of claim 16, wherein the at least two groups of identifiers comprise a first group of identifiers comprising dots from one to six and a second group of identifiers comprising six preselected colors.

19. The system of claim 16, wherein the plurality of betting areas equals 86 and at least one of the plurality of betting areas has an associated payout ratio of 44,000 to 1.

20. The system of claim 16, wherein the at least six dice have unique faces such that no combination of the two markings is repeated on any of the at least six dice.

* * * * *